(12) United States Patent
Tapia et al.

(10) Patent No.: US 9,813,477 B2
(45) Date of Patent: Nov. 7, 2017

(54) ADJUSTING QUALITY LEVEL OF MEDIA STREAMING

(71) Applicant: T-Mobile USA, Inc., Bellevue, WA (US)

(72) Inventors: Pablo Tapia, Snoqualmie, WA (US); Kevin Lau, Issaquah, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 181 days.

(21) Appl. No.: 14/605,941

(22) Filed: Jan. 26, 2015

(65) Prior Publication Data
US 2016/0219092 A1    Jul. 28, 2016

(51) Int. Cl.
*H04L 29/06* (2006.01)

(52) U.S. Cl.
CPC .......... *H04L 65/80* (2013.01); *H04L 65/1083* (2013.01); *H04L 65/604* (2013.01)

(58) Field of Classification Search
CPC .................... H04L 65/4069; H04L 65/80
See application file for complete search history.

(56) References Cited

U.S. PATENT DOCUMENTS

| | | | |
|---|---|---|---|
| 6,842,724 B1* | 1/2005 | Lou | H04N 21/4384 348/172 |
| 2011/0093605 A1* | 4/2011 | Choudhury | H04L 65/4084 709/231 |
| 2013/0100228 A1 | 4/2013 | Tapia et al. | |
| 2013/0286227 A1 | 10/2013 | Lau et al. | |
| 2014/0007175 A1 | 1/2014 | Cho et al. | |
| 2015/0256581 A1* | 9/2015 | Kolhi | H04L 65/602 709/219 |
| 2015/0341411 A1* | 11/2015 | Huber | H04L 65/4092 709/231 |

FOREIGN PATENT DOCUMENTS

KR    20140003648 A    1/2014

OTHER PUBLICATIONS

"International Search Report and Written Opinion" for PCT/US2016/014718, dated May 4, 2016, 12 pages.

* cited by examiner

*Primary Examiner* — Kim T Nguyen
(74) *Attorney, Agent, or Firm* — Han Santos, PLLC; Elliott Y. Chen

(57) ABSTRACT

Techniques described herein relate to adjusting a quality level of media streaming. A user device may transmit a request for a first segment of a media file at a first streaming quality level. The user device may determine changes in network communication quality associated with a wireless communication in that the user device is engaged. In response to a determination, the user device may adjust quality levels of media streaming.

19 Claims, 5 Drawing Sheets

ADJUSTING QUALITY LEVEL OF MEDIA STREAMING

BACKGROUND

Mobile devices are often equipped with processors that may perform many tasks, such as running various applications, recording data, playing media, and performing other tasks for a user. Mobile devices include telecommunication devices, Wi-Fi devices, and other devices having connectivity to a network. Mobile devices may use licensed spectrum such as the air interface in cellular networks in order to support, for example, playing the media. The mobile device has less bandwidth capacity than those of non-mobile devices with fixed networks, and wireless network conditions may be inconsistent. This may cause problems for continuously transferring and reconstructing data of the media while preserving the quality of playing the media.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Overview

In telecommunications, a bandwidth of a particular communication link used by a user device may fluctuate based on various conditions. To adapt to fluctuation of wireless communication bandwidth, such as fluctuating link quality, the use device may reduce a data transmission rate based on available link quality. For example, while streaming a video file, a video application on the user device may reduce the resolution of the video content.

Under conventional techniques, after detecting that link quality has improved, the user device may slowly increase the data transmission rate, for example to allow the video application to increase the resolution. Implementations herein describe that the user device initially sets the streaming video to a maximum resolution. If the maximum resolution results in performance problems for the video content, the user device reverts the streaming video to a lesser resolution. Subsequently, the resolution of the streaming video is gradually increased to a higher resolution, such as the maximum resolution.

Illustrative Environment

Figure 1:
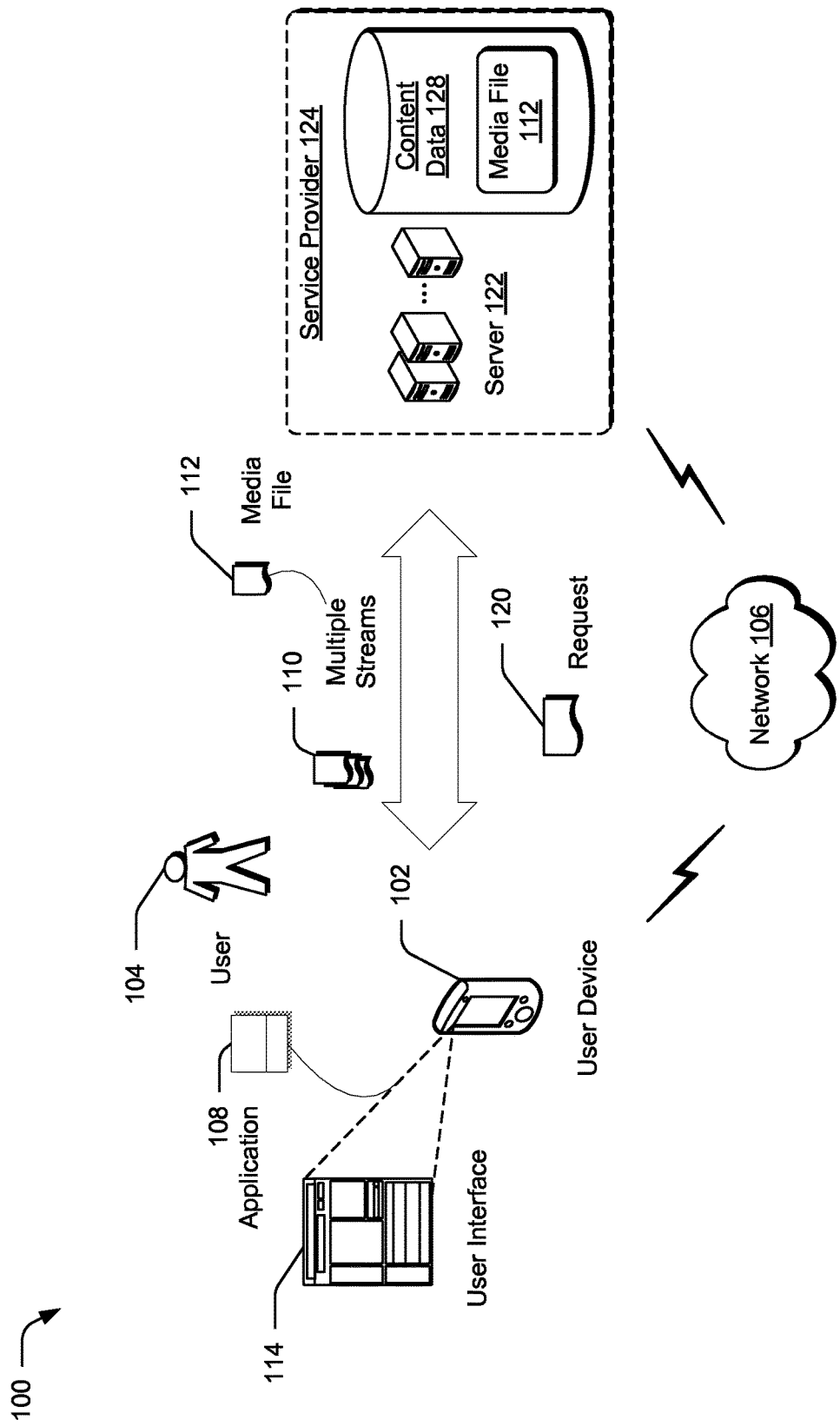
FIG. 1 is a diagram of an illustrative telecommunication environment that enables optimization of streaming media services.

FIG. 1 is a diagram of an illustrative environment 100 that enables optimization of streaming media services. The environment 100 includes a user device 102 associated with a user 104. The articles "a" and "an" are used herein to refer to one or to more than one (i.e. to at least one) of the grammatical object of the article. By way of example, "a user" means one user or more than one users. The user device 102 includes any type of device having a component for communicating with one or more other devices via one or more communication channels including, for example, wireless communication channels, such as infra-red, RF, optical, terrestrial, satellite communication media, and wired communication channels, such as copper wires, coaxial cables, Fiber-optic cables. Examples of the user device 102 may include mobile telephones/smartphones, netbooks, tablet computers, personal computers, data sticks, network adapters, and other electronic devices that may exchange signals, such as radio signals.

The user device 102 may exchange data with other computing devices through a network 106. The network 106 may include a plurality of hardware, software, and other infrastructure. The environment 100 shows an illustrative arrangement of the network 106; however, other arrangements may be used to facilitate transmission of data between the user device 102 and other computing devices.

The network 106 may include wired and/or wireless networks that enable communications between the various computing devices described in the environment 100. In some implementations, the network 106 may include local area networks (LANs), wide area networks (WAN), mobile telephone networks (MTNs), and other types of networks, possibly used in conjunction with one another, to facilitate communication between the various computing devices.

The user 104 may conduct media streaming such as video streaming by implementing an application 108 via the network. For example, the application may transmit a request 120 for the media file 112 to a server 122 associated with a service provider 124. In some implementations, the user device 102 may receive multiple streams 110 associated with a media file 112, and use the application 108 to present one or more segments of the multiple streams 110 in a user interface 114.

Data of the media file 112 includes, for example, video recordings, audio recordings, multimedia presentations, slide presentations, and/or online content. The media file 112 may include a video file, an audio file, a multimedia file, and/or a text file. For example, the media file 112 may include multiple frames of video content, and an individual frame of the multiple frames may represent an instance of the video content, for example, a picture.

In some implementations, the multiple streams 110 may correspond to multiple compressed streams representing media content from the media file 112 at various media quality levels. For example, the multiple compressed streams may represent the media content from a video file at various bit rates, which may range in video qualities from a high quality video stream to a low quality video stream. In some instances, an individual compressed stream of the multiple compressed streams may be divided into multiple streaming segments and stored in a data storage. In other instances, an individual streaming segment of the multiple streaming segments may represent the media content from the individual streaming segment at a predetermined streaming quality level.

The media file 112 may be maintained by the server 122 associated with the service provider 124. The service provider 124 may provide media services including media streaming of the content data 128, such as the media file 112, access to the Internet, and/or access to other services, such as value-added services. The content data 128 may include video recordings, audio recordings, multimedia presentations, slide presentations, CD-ROM, and/or online content. The content data 128 may be either analog electronic data format or digital electronic data format.

In some implementations, the user device 102 may transmit the request 120 for a first streaming segment of the media file 120 at an initial streaming quality level.

The network communication quality is associated with a wireless communication in that the user device is engaged. For example, the network communication quality may include link quality, which relates to at least one of network bandwidth capacity, network congestion, radio signal quality parameters such as signal strength, variance, and reliability. The network communication quality may be rated by the nominal maximum data transmission rate, which depends on a network service provider's policies and/or routing equipment capacities. The available maximum data transmission rate is normally lower than the nominal maximum data transmission rate because of network congestion and network throttling. In some implementations, the available maximum data transmission rate may fluctuate over time.

In some implements, the user device 102 may determine that the network communication quality has decreased. In response to the determination, the user device 102 may transmit the request 120 for a second segment of the media file at a second streaming quality level. For example, the second streaming segment may represent a portion of media content subsequent to the portion of the first streaming segment. In some instances, the second streaming quality level is lower than the first streaming quality level.

In some implementations, the user device may determine that the network communication quality has increased. In response to the determination, the user device 102 may transmit the request 120 for a third segment of the media file 112 at a third streaming quality level. For example, the third streaming segment may represent a portion of media content subsequent to the portion of the second streaming segment. In some instances, the third streaming quality level is higher than the first streaming quality level, or the third streaming quality level is the maximum streaming quality level.

Illustrative Architectures

Figure 2:
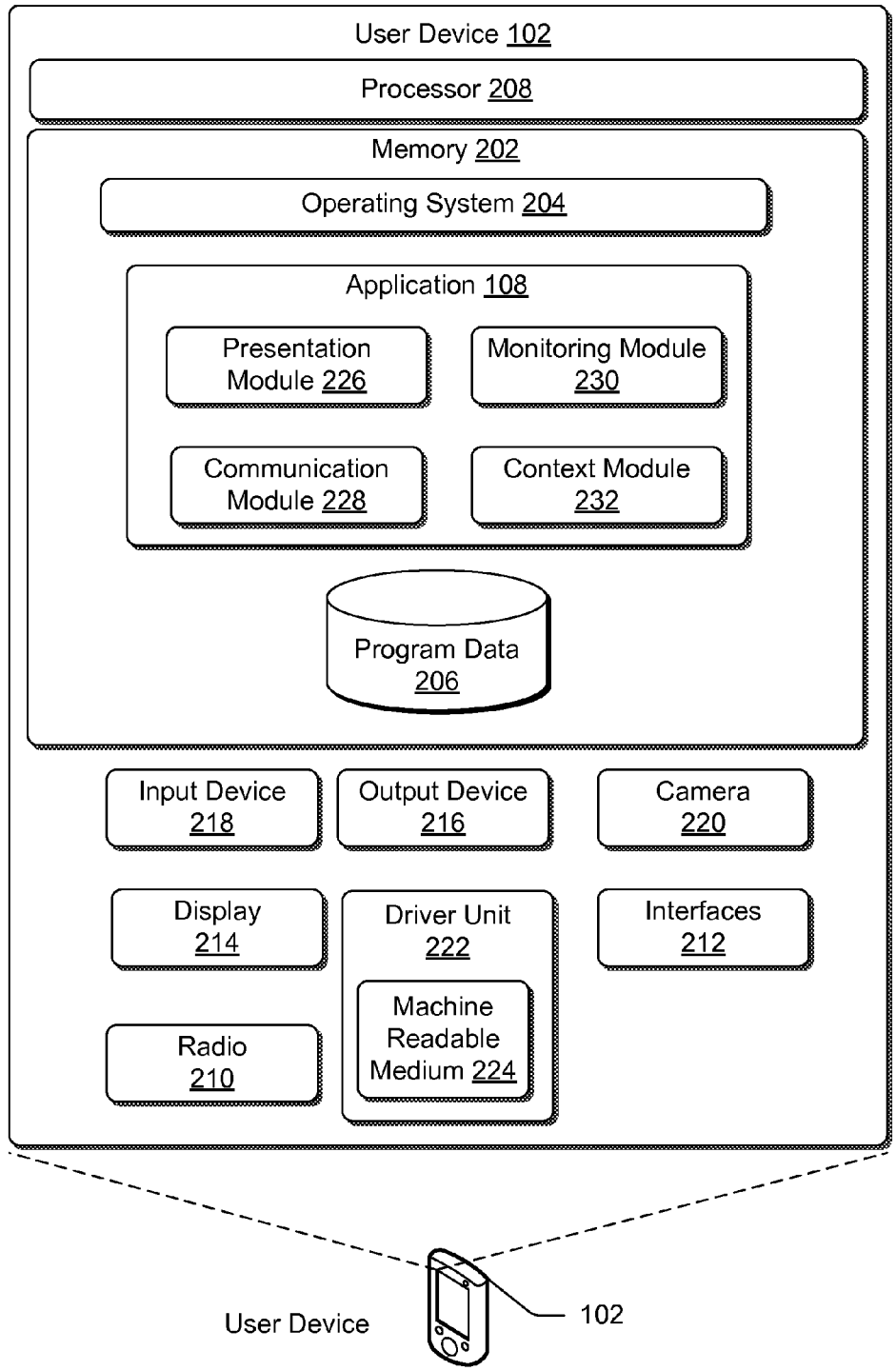
FIG. 2 is a schematic diagram of an illustrative computing architecture that adjusts a quality level of media streaming based on changes in network communication quality.

FIG. 2 is a schematic diagram of an illustrative computing architecture 200 that adjusts a quality level of media streaming based on changes in network communication quality. The computing architecture 200 shows additional details of at least one portion of the user device 102, which may include additional modules, kernels, data, and/or hardware.

In some implementations, the user device 102 may include a memory 202, the memory 202 storing an operating system (OS) 204, program data 206, and/or other component. The user device 102 may further include a processor 208, interfaces 212, a display 214, output devices 216, input devices 218, a camera 220, a radio 210, and drive unit 222, which may include a machine readable medium 224. In some implementations, the processor 208 is a central processing unit (CPU), a graphics processing unit (GPU), or both CPU and GPU, or other processing unit or component known in the art.

In various implementations, memory 202 generally includes both volatile memory and non-volatile memory. Such as RAM, ROM, EEPROM, Flash Memory, miniature hard drive, memory card, CD-ROM, digital versatile disks (DVD) or other optical storage, magnetic cassettes, magnetic tape, magnetic disk storage or other magnetic storage devices, or any other medium. Additionally, in some implementations, memory 202 includes a SIM (subscriber identity module) card, which is a removable memory card used to identify a user of the user device 102 to a service provider network.

Memory 202 may further be described as computer storage media. Computer-readable media may include, at least, two types of computer-readable media, namely computer storage media and communication media. Computer storage media may include volatile and non-volatile, removable, and non-removable media implemented in any method or technology for storage of information, such as computer readable instructions, data structures, program modules, program data, or other data. The system memory, the removable storage and the non-removable storage are all examples of computer storage media. Computer storage media includes, but is not limited to, RAM, ROM, EEPROM, flash memory or other memory technology, CD-ROM, digital versatile disks (DVD), or other optical storage, magnetic cassettes, magnetic tape, magnetic disk storage or other magnetic storage devices, or any other medium that may be used to store the desired information and which may be accessed by the user device 102. Any such computer storage media may be part of the user device 102. Moreover, the computer-readable media may include computer-executable instructions that, when executed by the processor(s), perform various functions and/or operations described herein.

In contrast, communication media may embody computer-readable instructions, data structures, program modules, or other data in a modulated data signal, such as a carrier wave, or other mechanism. As defined herein, computer storage media does not include communication media.

In various implementations, the interfaces 212 may include various types of interfaces. For example, the interfaces 212 include any one or more of an Ethernet interface, wireless local area network (LAN) interface, a near field interface, a DECT chipset, or an interface for an RJ-11 or RJ-42 port. The a wireless LAN interface may include a Wi-Fi interface or a Wi-Max interface, or a Bluetooth interface that performs the function of transmitting and receiving wireless communications using, for example, the IEEE 802.11, 802.16 and/or 802.20 standards. For instance, the user device 102 may use a Wi-Fi interface to communicate directly with a nearby device. The near field interface may include a Bluetooth® interface or radio frequency identifier (RFID) for transmitting and receiving near field radio communications via a near field antenna. For example, the near field interface may be used for functions, as is known in the art, such as communicating directly with nearby devices that are further, for instance, Bluetooth® or RFID enabled. A reader/interrogator may be incorporated into user device 102.

In various implementations, the display 214 is a liquid crystal display or any other type of display commonly used in telecommunication devices. For example, display 214 may be a touch-sensitive display screen, and may then further act as an input device or keypad, such as for providing a soft-key keyboard, navigation buttons, or the like.

In some implementations, the output devices 216 include any type of output devices, such as a display (already described as display 214), speakers, a vibrating mechanism, or a tactile feedback mechanism. The output devices 218 further include ports for one or more peripheral devices, such as headphones, peripheral speakers, or a peripheral display.

In various implementations, the input devices 218 include any type of input devices. For example, the input devices 218 may include a microphone, a keyboard/keypad, or a touch-sensitive display (such as the touch-sensitive display screen described above). A keyboard/keypad may be a push button numeric dialing pad (such as on a typical telecommunication device), a multi-key keyboard (such as a conventional QWERTY keyboard), or one or more other types of keys or buttons, and may further include a joystick-like controller and/or designated navigation buttons, or the like.

The machine readable medium 224 stores one or more sets of instructions, such as software, embodying any one or more of the methodologies or functions described herein. The instructions may further reside, completely or at least partially, within the memory 202 and within the processor 208 during execution thereof by the user device 102. Portions of the memory 202, as accessed by the processor 208, may further constitute machine readable media 224.

The memory 202 also store the application 108, which may include various components, such as a presentation module 226, a communication module 228, a monitoring module 230, and/or a context module 232. The communication module 228 may transmit the request 120 for a first streaming segment of the media file 112 at a first streaming quality level. In some implementations, the media file 112 may contain video content, and the first streaming quality level, the second streaming quality level and the third streaming quality level correspond to a resolution of video data of the video content, respectively.

In some implementations, the communication module 228 may transmit to the server 122 the request 120 for streaming the media file 112 that include multiple segments. The communication module 228 may receive metadata of the media file 112 from the server 122, and parse the metadata to obtain information regarding multiple segments of the media file 112. In some instances, an individual segment of the multiple segments may correspond to a streaming segment of the media file 112 that is streamed at a streaming quality level. For example, the individual segment of the multiple segments may represent a portion of video content of the media file 112 at a bit rate, such as 2,500 Kbps.

The monitoring module 230 may determine that network communication quality associated with at least a portion of the network 106 has decreased. The network communication quality is associated with a wireless communication in that the user device 102 is engaged. For example, the wireless communication may be implemented by a wireless communication link used by the user device 102. The wireless communication link may include one or more physical or logical communications channels that connect two or more communicating devices. In some implementations, the monitoring module 230 may measure the network communication quality based on information such as at least one of packet losses, transmission delays, or jitters during the wireless communication. In other implementations, the monitoring module 230 may receive data regarding the network communication quality as measured based on information associated with at least one of packet losses, transmission delays, or jitters during the wireless communication.

In response to the determining that the network communication quality has decreased, the communication module 228 may transmit the request 120 for a second segment of the media file 112 at a second streaming quality level. The second streaming quality level is lower than the first streaming quality level.

The monitoring module 238 may determine that the network communication quality has increased. In response to the determining that network communication quality has increased, the communication module 228 may transmit the request for a third segment of the media file 112 at a third streaming quality level. The third streaming quality level is higher than the first streaming quality level. In some implementations, the third streaming quality level may be the maximum streaming quality level. For example, the maximum streaming quality level may correspond to a native resolution of the video content.

In some implementations, the monitoring module 230 may detect one or more performance issues associated with a presentation of the media file. For example, the one or more performance issues may include a user-perceived latency associated with the presentation of the media file and/or an issue associated with buffering the third segment of the media file at the third streaming quality level. In response to the detection, the communication module 228 may transmit the request 120 for a fourth segment of the media file at a fourth streaming quality level that is lower than the third streaming quality level.

In some implementations, the context module 232 may be configured to determine context associated with the wireless communication that the user device 102 is engaged. Based on the determined context, the application 116 may determine whether to adopt media streaming optimization. For example, the context module 232 may detect bandwidth throttling imposed on a user account associated with the user device 102 or network congestion associated with the wireless communication.

In some instances, in response to the detection, the context module 232 may communicate with the communication module 228 and/or other components of the application 108 to stop requesting a segment of the media file 112 at a higher streaming quality level than a current streaming quality level. For example, in response to detecting the bandwidth throttling, the communication module 232 may transmit the request 120 for a fourth segment of the media file 112 at the second streaming quality level or a streaming quality level lower than the second streaming quality level.

In some implementations, the monitoring module 230 may monitor one or more quality of service (QoS) metrics associated with presentation of the media file and/or the wireless communication. Based on the one or more QoS metrics, the presentation module 226 may determine the first streaming quality level. In some instances, the one or more QoS metrics may include at least one of a network bandwidth capacity associated with the wireless communication, an available network bandwidth capacity associated with the wireless communication, a current streaming quality level associated with the presentation of the media file 112, or a latency associated with the presentation of the media file 112.

Figure 3:
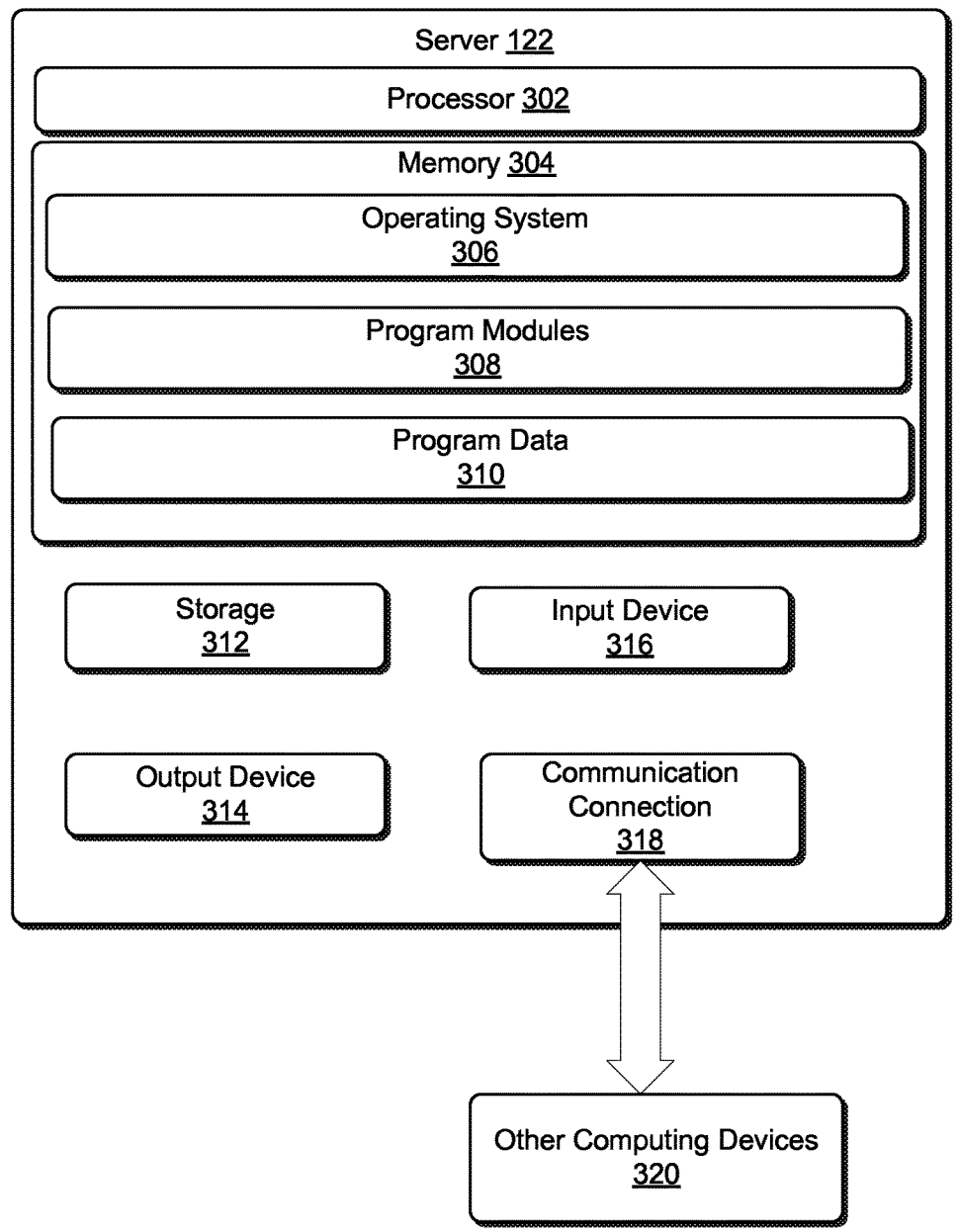
FIG. 3 is a schematic diagram of an illustrative computing architecture that facilitates optimization of streaming media services.

FIG. 3 is a schematic diagram of an illustrative computing architecture 300 that facilitates optimization of streaming media services. The computing architecture 300 shows additional details of at least one portion of the server 122, which may include additional modules, kernels, data, and/or hardware.

In various implementations, the server 122 may include at least one processing unit 302 and system memory 304. Depending on the exact configuration and type of computing device, system memory 304 may be volatile, such as RAM, non-volatile, such as ROM, flash memory, or some combination of the two. The system memory 304 may store an operating system 306, one or more program modules 308, and may include program data 310.

The server 122 may further include additional data storage devices (removable and/or non-removable) such as, for example, magnetic disks, optical disks, or tape. Such additional storage is illustrated in FIG. 3 by storage 312. Computer storage media may include volatile and nonvolatile, removable and non-removable media implemented in any method or technology for storage of information, such as computer readable instructions, data structures, program modules, or other data. The system memory 304 and storage 312 are all examples of computer-readable storage media. Computer-readable storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by the server 122. Any such computer-readable storage media may be part of the server 122.

In various implementation, any or all of the system memory 304 and the storage 312 may store programming instructions which, when executed, implement some or all of the above-described operations of the server 122 or other components described in the environment 100 shown in FIG. 1.

The server 122 may further have input device(s) 314, such as a keyboard, a mouse, a touch-sensitive display, voice input device. Output device(s) 316, such as a display, speakers, and a printer may further be included. The server 122 may further contain communication connections 318 that allow the device to communicate with other computing devices 320. In various implementations, the server 122 may be configured to manage, for example, data streaming services.

Illustrative Processes

Figure 4:
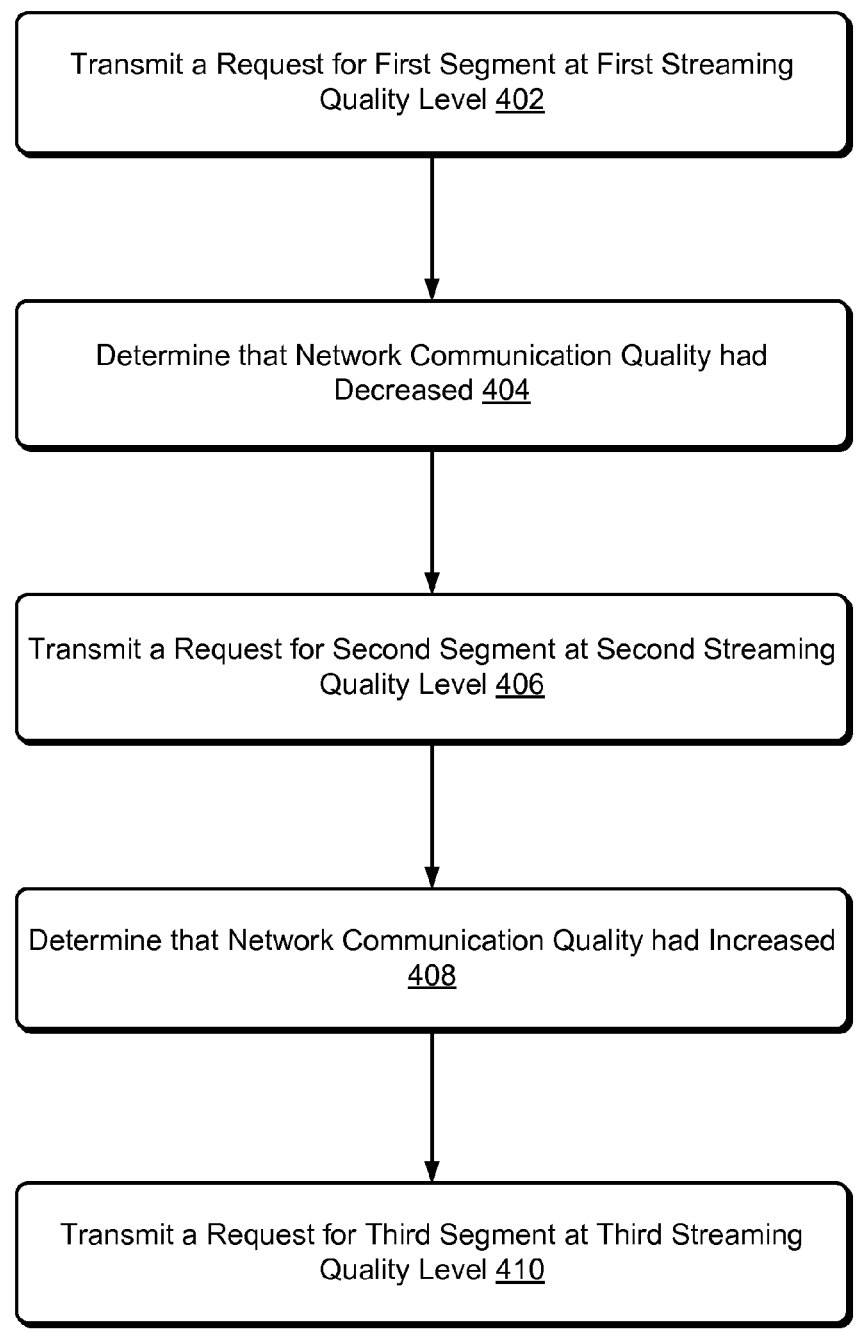
FIG. 4 is a flow diagram of an illustrative process for adjusting a quality level of media streaming based on changes in network communication quality.
Figure 5:
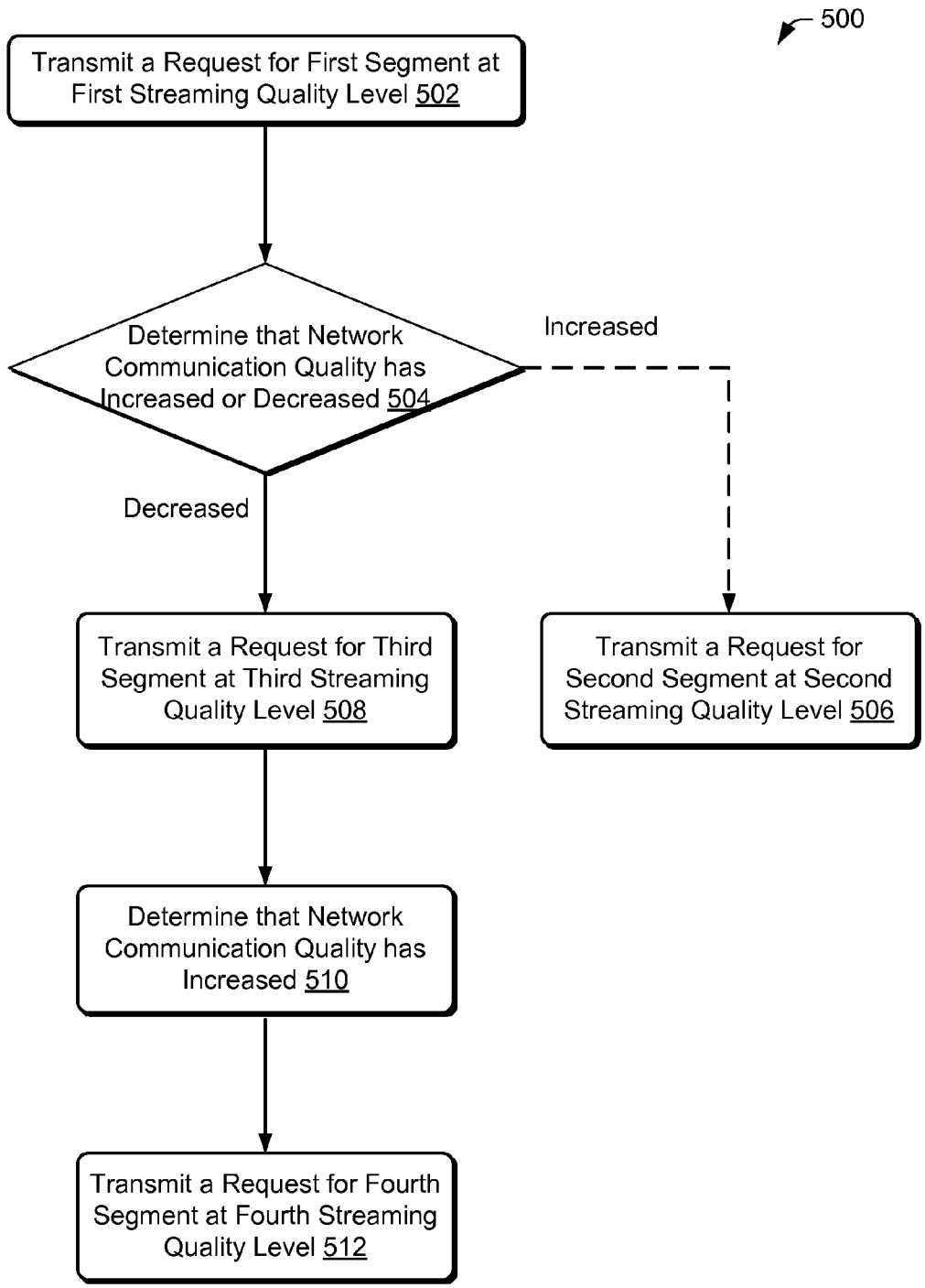
FIG. 5 is another flow diagram of an illustrative process for adjusting a quality level of media streaming based on changes in network communication quality.

FIG. 4 and FIG. 5 present illustrative processes 400 and 500 for adjusting a quality level of media streaming based on changes in network communication quality. Each of the processes 400 and 500 is illustrated as a collection of blocks in a logical flow graph, which represent a sequence of operations that may be implemented in hardware, software, or a combination thereof. In the context of software, the blocks represent computer-executable instructions that, when executed by one or more processors, cause the one or more processors to perform the recited operations. Generally, computer-executable instructions include routines, programs, objects, components, data structures, and the like that perform particular functions or implement particular abstract data types. The order in which the operations are described is not intended to be construed as a limitation, and any number of the described blocks may be combined in any order and/or in parallel to implement the process.

FIG. 4 is a flow diagram of an illustrative process 400 for adjusting a quality level of media streaming based on changes in network communication quality. The process 400 is described with reference to the computing environment 100, as well as the computing architectures 200 and 300. However, the process 400 may be implemented in other environments, and/or computing architecture.

At 402, one or more processors of the user device 102 may transmit the request 120 for a first streaming segment of the media file 112 at a first streaming quality level. In some implementations, the first streaming quality level may be determined based on one or more QoS metrics associated with presentation of the media file and/or wireless communication.

At 404, the one or more processors may determine that network communication quality of a wireless communication link provided by at least a portion of the network 106 has decreased. The wireless communication link may be a wireless communication link between the user device 102 and the server 122 established via the network 106

At 406, in response to the determining that the network communication quality has decreased, the one or more processors may transmit the request 120 for a second segment of the media file 112 at a second streaming quality level. The second streaming quality level is lower than the first streaming quality level.

At 408, the one or more processors may determine that the network communication quality has increased.

At 410, in response to the determining that network communication quality has increased, the one or more processors may transmit the request 120 for a third segment of the media file 112 at a third streaming quality level. The third streaming quality level is higher than the first streaming quality level.

FIG. 5 is another flow diagram of an illustrative process 500 for adjusting a quality level of media streaming based on changes in network communication quality. The process 500 is described with reference to the computing environment 100 and the computing architectures 200 as well as 300. However, the process 500 may be implemented in other environments, and/or computing architecture.

At 502, one or more processors of the user device 102 may transmit the request 120 for a first segment of the media file 112 at a first streaming quality level.

At 504, the one or more processors may determine whether network communication quality of a communication link has changed. The communication link may be a wireless communication link between the user device 102 and the server 122.

At 506, in response to a determination the network communication quality has increased (i.e., "increased" branch of the operation 504), the one or more processors may transmit the request 120 for a second segment of the media file 112 at a second streaming quality level. In these instances, the second streaming quality level is higher than the first streaming quality level.

At 508, in response to a determination that the network communication has decreased (i.e., "decrease" branch of the operation 504), the one or more processors may transmit the request 120 for a third segment of the media file 112 at a third streaming quality level. The third streaming quality level is lower than the first streaming quality level.

At 510, the one or more processors may determine that the network communication quality has increased.

At 512, in response to the determining that network communication quality has increased, the one or more processors may transmit the request 120 for a fourth segment of the media file 112 at a fourth streaming quality level. The fourth streaming quality level is higher than the first streaming quality level.

CONCLUSION

Although the subject matter has been described in language specific to structural features and/or methodological acts, it is to be understood that the subject matter defined in the appended claims is not necessarily limited to the specific features or acts described above. Rather, the specific features and acts are disclosed as example forms of implementing the claims.

What is claimed is:

1. A method for operating a user device, the method comprising:
    transmitting, by one or more processors of the user device, a request for a first segment of a media file stored on a server at a first streaming quality level to the server via a communication link, the media file comprising a plurality of segments that include the first segment;

detecting, by the one or more processors, a latency associated with a presentation of the media file that comprises the plurality of segments on the user device;

in response to the detection of the latency associated with the presentation of the media file that includes the plurality of segments on the user device, transmitting a request for a second segment of the media file at a second streaming quality level that is lower than the first streaming quality level;

receiving, by the one or more processors, a message indicating bandwidth throttling is imposed on a user account associated with the user device; and in response to the receiving, transmitting a request for a third segment of the media file at the first streaming quality level or a streaming quality level lower than the first streaming quality level.

2. The method of claim 1, wherein the media file comprises video content, and wherein the first streaming quality level and the second streaming quality level correspond to a resolution of video data of the video content, respectively.

3. The method of claim 1, further comprising:
receiving metadata of the media file; and
parsing the metadata to obtain information regarding the plurality of segments of the media file, an individual segment of the plurality of segments representing a segment of the media file at a streaming quality level.

4. The method of claim 1, further comprising:
determining, by the one or more processors, that network communication quality of the communication link has decreased;
in response to the determining that the network communication quality has decreased, transmitting, by the one or more processors, a request for a fourth segment of the media file at a third streaming quality level to the server via the communication link, the third streaming quality level lower than the first streaming quality level;
determining, by the one or more processors, that the network communication quality has increased; and
in response to the determining that the network communication quality has increased, transmitting, by the one or more processors, a request for a fifth segment of the media file at a fourth streaming quality level to the server via the communication link, the fourth streaming quality level higher than the first streaming quality level.

5. The method of claim 1, further comprising:
detecting, by the one or more processors, a latency associated with buffering a second segment of the media file at a second streaming quality level; and
in response to the detection of the latency associated with buffering the second segment, transmitting a request for a fourth segment of the media file at a third streaming quality level that is lower than the second streaming quality level.

6. The method of claim 1, wherein the media file comprises video content, the second streaming quality level is a maximum streaming quality level that is provide by the communication link, and the maximum streaming quality level corresponds to a native resolution of the video content.

7. The method of claim 1, further comprising:
measuring network communication quality based on information associated with at least one of a packet loss, a transmission delay, or a jitter in the communication link.

8. The method of claim 7, further comprising:
receiving data of the network communication quality measured based on information associated with at least one of a packet loss, a transmission delay, or a jitter in the communication link.

9. The method of claim 1, further comprising:
monitoring one or more quality of service (QoS) metrics associated with the presentation of the media file or the communication link, or a combination thereof; and
determining the first streaming quality level based on the one or more QoS metrics.

10. The method of claim 9, wherein the one or more QoS metrics comprise at least one of:
a network bandwidth capacity associated with the communication link;
an available network bandwidth capacity associated with the communication link;
a current streaming quality level associated with the presentation of the media file; or
a latency associated with the presentation of the media file.

11. One or more non-transitory computer-readable media of a user device storing computer-executable instructions that, when executed on one or more processors, causes the one or more processors to perform acts comprising:
transmitting a request for a first segment of a media file at a first streaming quality level from the user device to a server via a communication link;
receiving, at the user device, a message indicating bandwidth throttling is imposed on a user account associated with the user device; and
in response to the receiving the message indicating the bandwidth throttling is imposed on the user account, transmitting a request for a second segment of the media file at a second streaming quality level or a streaming quality level lower than the first streaming quality level to the server.

12. The one or more non-transitory computer-readable media claim 11, wherein the acts further comprise:
in response to a determination that a network communication quality of the communication link has increased:
transmitting a request for a third segment of the media file at a third streaming quality level to the server via the communication link, the third streaming quality level higher than the first streaming quality level;
detecting, at the user device, one or more performance issues associated with presentation of the media file; and
in response to the detection of the one or more performance issues, transmitting a request for a fourth segment of the media file at a fourth streaming quality level that is lower than the third streaming quality level to the server.

13. The one or more non-transitory computer-readable media claim 12, wherein the one or more performance issues comprise a latency associated with the presentation of the media file or an issue associated with buffering the fourth segment of the media file at the fourth streaming quality level, or a combination thereof.

14. The one or more non-transitory computer-readable media claim 11, wherein the acts further comprise:

monitoring one or more quality of service (QoS) metrics associated with presentation of the media file or the communication link, or a combination thereof; and determining the first streaming quality level based on the one or more QoS metrics.

15. A user device comprising:

one or more processors; and memory to maintain a plurality of components executable by the one or more processors, the plurality of components comprising:

an application configured to:

transmit a request for a first segment of a media file at a first streaming quality level to a server via a communication link, determine that network communication quality of the communication link as measured based on a combination of data packet loss and jitters during wireless communication has decreased;

in response to the determination that the network communication quality as measured based on the combination of the data packet loss and the jitters during the wireless communication has decreased, transmit a request for a second segment of the media file at a second streaming quality level to the server via the communication link, the second streaming quality level lower than the first streaming quality level;

determine that the network communication quality has increased;

in response to the determination that the network communication quality has increased, transmit a request for a third segment of the media file at a third streaming quality level to the server via the communication link, the third streaming quality level higher than the first streaming quality level; and detect one or more performance issues associated with presentation of the media file, wherein the one or more performance issues comprise a latency associated with buffering the third segment of the media file at the third streaming quality level; and in response to the detection of the one or more performance issues that comprise the latency associated with buffering the third segment, transmit a request for a fourth segment of the media file at a fourth streaming quality level that is lower than the third streaming quality level.

16. The user device of claim 15, wherein the media file comprises video content, and wherein the first streaming quality level, the second streaming quality level and the third streaming quality level correspond to a resolution of video data of the video content, respectively.

17. The user device of claim 15, wherein the application is further configured to:

transmit a request for streaming the media file that comprises a plurality of segments;

receive metadata of the media file; and parse the metadata to obtain information from the plurality of segments of the media file, an individual segment of the plurality of segments representing a segment of the media file at a streaming quality level.

18. The user device of claim 15, wherein the application is further configured to:

detect one or more additional performance issues associated with presentation of the media file; and in response to the detection of the one or more additional performance issues, transmit a request for a fifth segment of the media file at a fourth streaming quality level that is lower than the third streaming quality level.

19. The user device of claim 18, wherein the one or more performance issues further comprise a latency associated with the presentation of the media file.

* * * * *